(12) United States Patent
Verma et al.

(10) Patent No.: US 11,403,538 B1
(45) Date of Patent: Aug. 2, 2022

(54) METHODS AND APPARATUS FOR GENERATING FAST COUNTERFACTUAL EXPLANATIONS FOR BLACK-BOX MODELS USING REINFORCEMENT LEARNING

(71) Applicant: Arthur AI, Inc., New York, NY (US)

(72) Inventors: Sahil Verma, Seattle, WA (US); John Dickerson, Washington, DC (US); Keegan Hines, Richmond, VA (US)

(73) Assignee: Arthur AI, Inc., New York, NY (US)

(*) Notice: Subject to any disclaimer, the term of this patent is extended or adjusted under 35 U.S.C. 154(b) by 0 days.

(21) Appl. No.: 17/520,069

(22) Filed: Nov. 5, 2021

Related U.S. Application Data

(60) Provisional application No. 63/110,292, filed on Nov. 5, 2020.

(51) Int. Cl.
*G06N 5/04* (2006.01)
*G06K 9/62* (2022.01)

(52) U.S. Cl.
CPC .......... *G06N 5/045* (2013.01); *G06K 9/6264* (2013.01); *G06K 9/6297* (2013.01)

(58) Field of Classification Search
None
See application file for complete search history.

(56) References Cited

U.S. PATENT DOCUMENTS

| | | | |
|---|---|---|---|
| 2018/0121766 A1* | 5/2018 | McCord | G06K 9/6297 |
| 2019/0347371 A1* | 11/2019 | Sankar | G06Q 30/0201 |
| 2021/0089958 A1* | 3/2021 | Theocharous | G06N 7/005 |

FOREIGN PATENT DOCUMENTS

CN 112760908 A * 5/2021

OTHER PUBLICATIONS

C. Liu; F. Tang; Y. Hu; K. Li; Z. Tang; K. Li, "Distributed Task Migration Optimization in MEC by Extending Multi-Agent Deep Reinforcement Learning Approach", IEEE Transactions on Parallel and Distributed Systems Year: 2021, vol. 32, Issue: 7, Journal Article Publisher: IEEE, pp. 1603-1614 (Year: 2021).*
Translation of "CN-112760908", obtained via PE2E, Translation on Jan. 15, 2022. (Year: 2021).*
Karimi, A.-H. et al., "Algorithmic Recourse: from Counterfactual Explanations to Interventions," [Online], arXiv:2002.06278 [cs.LG] Oct. 8, 2020, Retrieved from the Internet: http://arxiv.org/abs/2002.06278, 10 pages.

(Continued)

*Primary Examiner* — Tahmina N Ansari
(74) *Attorney, Agent, or Firm* — Cooley LLP

(57) ABSTRACT

In an embodiment, the systems and methods discussed herein are related to generating, via a processor, a Markov Decision Process (MDP), the MDP including a state space, an action space, a transition function, a reward function, and a discount factor. A reinforcement learning (RL) model is applied, via the processor, to the MDP to generate a RL agent. An input data associated with a first user is received at the RL agent. At least one counterfactual explanation (CFE) is generated via the processor and by the RL agent and based on the input data. A representation of the at least one CFE and at least one recommended remedial action is caused to transmit, via the processor, to at least one of a compute device of the first user or a compute device of a second user different from and associated with the first user.

20 Claims, 13 Drawing Sheets

(56) References Cited

OTHER PUBLICATIONS

Karimi, A.-H. et al., "Model-Agnostic Counterfactual Explanations for Consequential Decisions," [Online], arXiv:1905.11190 [cs.LG] Feb. 28, 2020, Proceedings of the 23rd International Conference on Artificial Intelligence and Statistics (AISTATS) 2020, Palermo, Italy, Retrieved from the Internet: http://arxiv.org/abs/1905.11190, 16 pages.

Mahajan, D. et al., "Preserving Causal Constraints in Counterfactual Explanations for Machine Learning Classifiers," Machine Learning and Causal Inference for Improved Decision Making Workshop, 33rd Conference on Neural Information Processing Systems (NeurIPS 2019), Vancouver, Canada, [Online], arXiv:1912.03277 [cs.LG] Jun. 12, 2020, Retrieved from the Internet: http://arxiv.org/abs/1912.03277, 19 pages.

Mothilal, R. K. et al., "Explaining Machine Learning Classifiers through Diverse Counterfactual Explanations," In Proceedings of the Conference on Fairness, Accountability, and Transparency, [Online], FAT* '20, Jan. 27-30, 2020, Barcelona, Spain, pp. 607-617, Retrieved from the Internet: https://doi.org/10.1145/3351095.3372850.

Pawelczyk, M. et al., "Learning Model-Agnostic Counterfactual Explanations for Tabular Data," Proceedings of the International World Wide Web Conference, WWW '20, Apr. 20-24, 2020, Taipei, Taiwan, arXiv: 1910.09398 [cs.LG], May 2020, [Online], Retrieved from the Internet: https://doi.org/10.1145/3366423.3380087, 10 pages.

Poyiadzi, R. et al., "FACE: Feasible and Actionable Counterfactual Explanations," In AIES '20: Proceedings of the AAAI/ACM Conference on AI, Ethics and Society, New York, NY, Feb. 7-8, 2020, pp. 344-350. Association for Computing Machinery (ACM) (Feb. 2020), [Online], Retrieved from the Internet: https://doi.org/10.1145/3375627.3375850.

Sharma, S. et al., "CERTIFAI: Counterfactual Explanations for Robustness, Transparency, Interpretability, and Fairness of Artificial Intelligence models," [Online], arXiv:1905.07857 [cs.LG] May 20, 2019, Retrieved from the Internet: http://arxiv.org/abs/1905.07857, 8 pages.

Van Looveren, A. et al., "Interpretable Counterfactual Explanations Guided by Prototypes," [Online], arXiv:1907.02584 [cs.LG] Feb. 18, 2020, Retrieved from the Internet: http://arxiv.org/abs/1907.02584, 17 pages.

Wachter, S. et al., "Counterfactual Explanations Without Opening the Black Box: Automated Decisions and the GDPR," [Online], Harvard Journal of Law & Technology, vol. 31, No. 2, Spring 2018, pp. 842-887, Retrieved from the Internet: http://dx.doi.org/10.2139/ssrn.3063289.

* cited by examiner

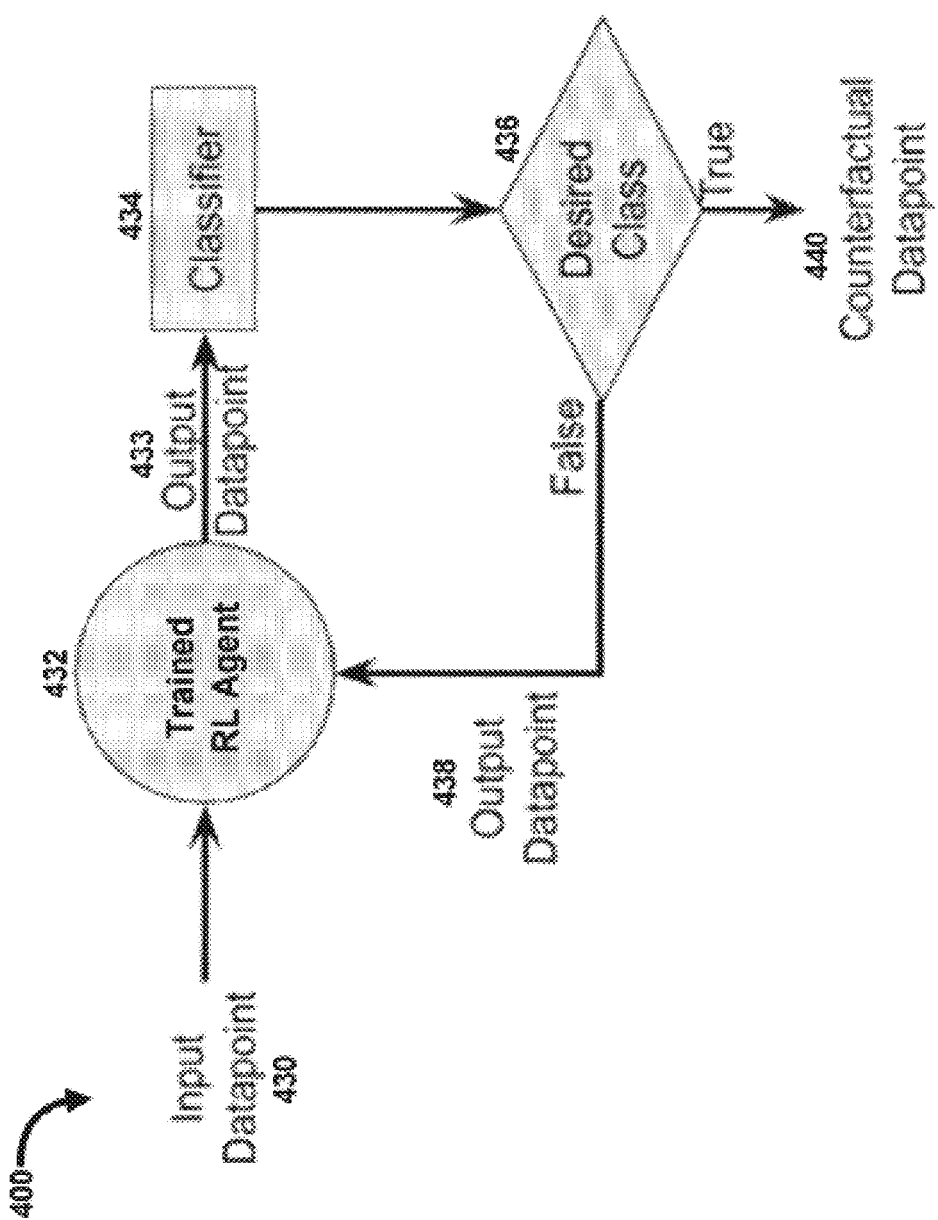

```
ALGORITHM 1: Generate MDP from a Counterfactual Ex-
              planation Problem
  Input   : Training Dataset (D), ML model (f), Causal
            relations: Unary (Un) and Binary (Bin), Categorical
            actionable feature (Cat), Numerical actionable
            features (Num), Data Manifold adherence factor
            (λ), Trained KNN Model (KNN), #Neighbours (K),
            Desirable Label (L), Distance Function (DistF),
            Discount Factor (γ)
  Output: MDP
1 State space S = ℝ^|Num| × ⨉_{i=1}^{|Cat|} Cat_i
2 Action space 𝒜 = {F_i+, F_i−∀i ∈ Num, F_j+1, F_j−1 ∀j ∈ Cat}
3 Function Transition(CurrState, A_j, Un, Bin)
4     for i ∈ Un do
5         if i = j then
6             if Allowed(A_j) then
7                 State' = CurrState + A_j  // Modify j
8             else
9                 return CurrState  // Illegal action
10            end
11        end
12        for i_1, i_2 ∈ Bin do
13            if i_1 = j then
14                State'[i_2] = BinFn(State'[i_1])  // Modify other
                                                       features
15            end
16    return FinalState

...

17 Function Reward(f, L, CurrState, A_j, D, λ, K, KNN, Un, Bin)
18     Cost1 = DistF(CurrState, A_j, D) − 1  // Cost of an
                                                action given current state and training dataset
19     FinalState = Transition(CurrState, A_j, Un, Bin)
20     Cost2 = λ * KNN(K, FinalState)  // Penalization for
                                         non-adherence to data manifold
       // Reward it if the new state has desired label
21     if f(FinalState) = L then
22         CFReward = Pos  // High positive reward
23     else
24         CFReward = 0
25     end
26     return Cost1 + Cost2 + CFReward
27 MDP = {S, 𝒜, Transition, Reward, γ}

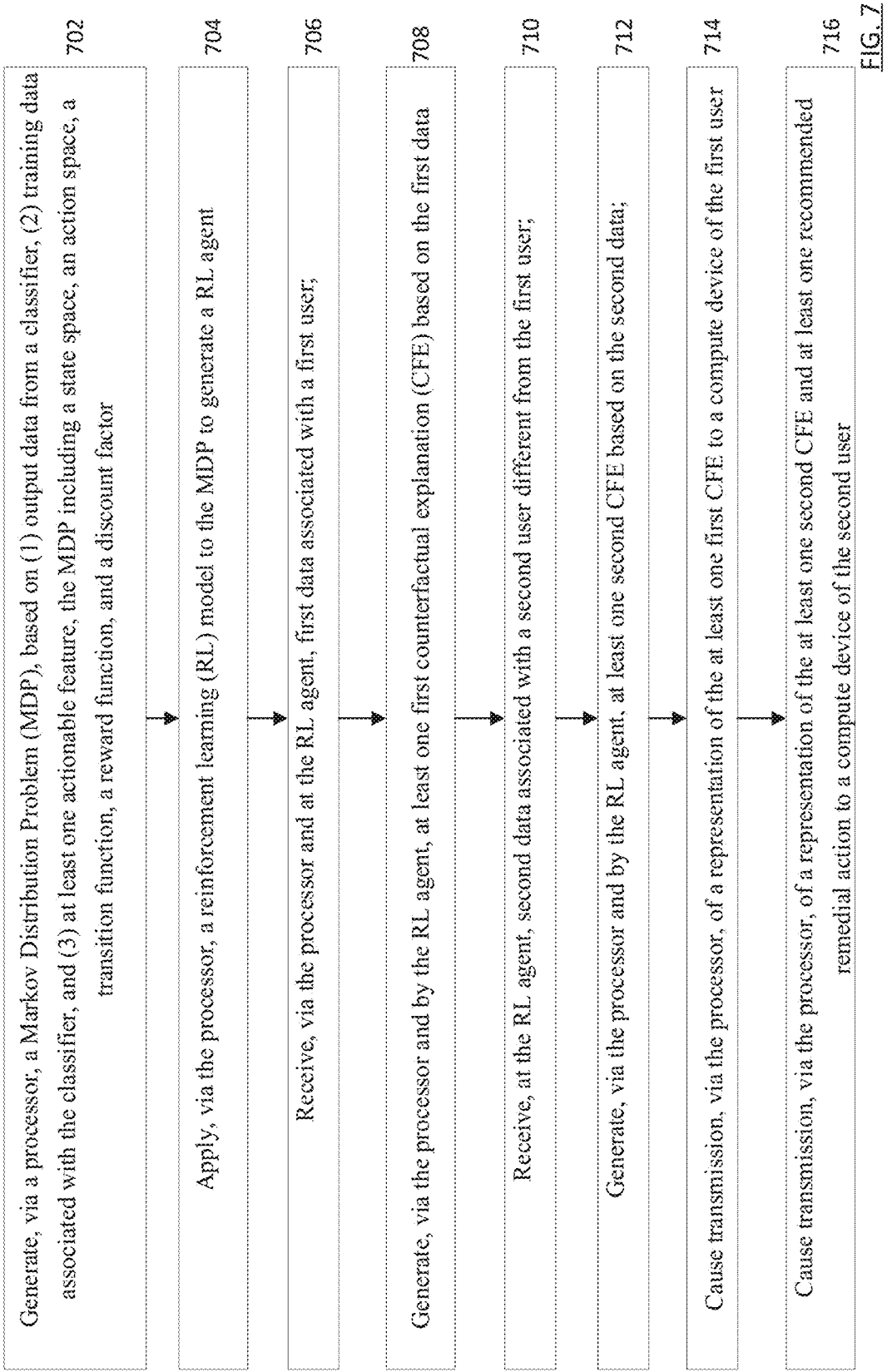

… # METHODS AND APPARATUS FOR GENERATING FAST COUNTERFACTUAL EXPLANATIONS FOR BLACK-BOX MODELS USING REINFORCEMENT LEARNING

CROSS REFERENCE TO RELATED APPLICATIONS

This application claims priority to and the benefit of U.S. Provisional Patent Application No. 63/110,292, filed Nov. 5, 2020 and titled "Methods and Apparatus for Generating Fast Counterfactual Explanations for Black-box Models using Reinforcement Learning," the contents of which are incorporated herein by reference.

FIELD

In one or more embodiments, fast counterfactual explanations are generated for black-box models using reinforcement learning to provide recommended actions for a user to take to cause the user to efficiently achieve a target state.

BACKGROUND

Human-understandable explanations for machine-produced decisions are advantageous as machine-learning-based systems become more prevalent across many industries. A particularly promising way of proving explanations for the decisions of machine learning (ML) models is by providing counterfactual explanations (CFEs). For a given input (datapoint), a CFE describes the smallest change to feature values that would change the prediction of a ML-based system to a predefined output.

SUMMARY

One or more embodiments of the present disclosure address the calculation and generation of human-understandable explanations for the decisions of machine learning models. Specifically, these one or more embodiments entail the fast calculation of Counterfactual Explanations (CFEs) for a black-box machine learning model.

As used herein, "fast calculation" refers to, for example, the ability to compute CFEs without using computationally expensive gradient descent or optimization methods for each desired explanation. As used herein, "black-box" refers to, for example, a degree of access to the intervals of a machine learning model when calculating/computing an explanation. In a black-box setting, one or more methods described herein do not require any knowledge of the ML model's composition, structure, or gradients. Such methods, for example, only need to invoke scores/predictions from the ML model.

In one or more embodiments, the problem of calculating a CFE is recast into a Markov Decision Process (MDP) and reinforcement learning (RL) is used to train an RL agent to quickly calculate CFEs. The RL approach is flexible and general, allowing one or more embodiments described herein to encompass many constraints/desiderata for CFEs, such as actionability, causality, and realism.

One or more embodiments can be applied to tabular, numeric datasets, as well as to unstructured data such as images.

In one or more embodiments, a method comprises generating, via a processor, a MDP, based on (1) output data from a classifier, (2) training data associated with the classifier, and (3) at least one actionable feature, the MDP including a state space, an action space, a transition function, a reward function, and a discount factor. A RL model is applied, via the processor, to the MDP to generate a RL agent. First data associated with a first user is received via the processor at the RL agent. At least one first CFE is generated, via the processor and by the RL agent, based on the first data. Second data associated with a second user different from the first user is received at the RL agent. At least one second CFE is generated, via the processor and by the RL agent, based on the second data. A representation of the at least one first CFE is caused to transmit, via the processor, to a compute device of the first user. A representation of the at least one second CFE and at least one recommended remedial action is caused to transmit, via the processor, to a compute device of the second user.

In one or more embodiments, a method comprises generating, via a processor, a MDP based on (1) output data from a classifier, (2) training data associated with the classifier, and (3) at least one actionable feature, the MDP including a state space, an action space, a transition function, and a reward function. A RL model is applied, via the processor, to the MDP to generate a RL agent. An input data associated with a user is received via the processor and at the RL agent. At least one CFE is generated, via the processor and by the RL agent, based on the input data. A representation of the at least one CFE and at least one recommended remedial action is caused to transmit, via the processor, to a compute device of the user.

In one or more embodiments, a method, comprises generating, via a processor, a MDP, the MDP including a state space, an action space, a transition function, a reward function, and a discount factor. A RL model is applied, via the processor, to the MDP to generate a RL agent. An input data associated with a first user is received at the RL agent. At least one CFE is generated via the processor, by the RL agent, and based on the input data. A representation of the at least one CFE and at least one recommended remedial action is caused to transmit, via the processor, to at least one of a compute device of the first user or a compute device of a second user different from and associated with the first user.

BRIEF DESCRIPTION OF THE DRAWINGS

FIG. 4 is a diagram showing information flows during generation of a counterfactual datapoint, according to an embodiment.

FIG. 6 shows an algorithm for generating a MDP from a given CFE scenario, according to an embodiment.

FIG. 7 shows a flowchart of a method for generating a MDP, generating an RL agent based on the MDP, and generating a plurality of CFEs using the RL agent, according to an embodiment.

DETAILED DESCRIPTION

Figure 1:
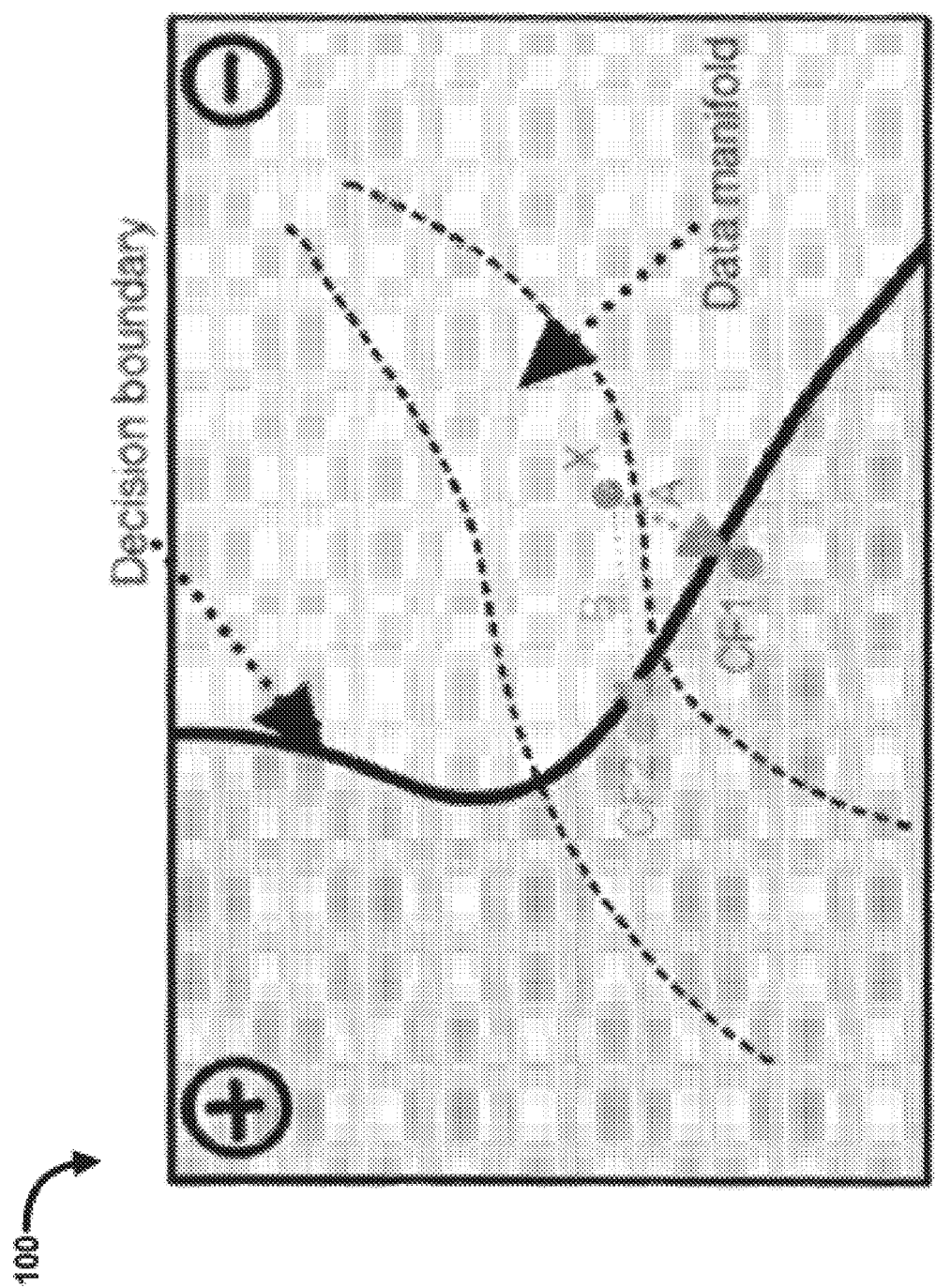
FIG. 1 is a diagram showing example counterfactual explanations for a datapoint, according to an embodiment.

When machine learning (ML) models are used to generate predictions for instances of a dataset, counterfactual explanations (CFEs) can be used to explain the predictions and/or recommend remedial actions to achieve a desired state. As an illustrative example, if a credit card applicant is denied for a credit line, a counterfactual explanation may be generated to provide the credit card applicant with information about why the credit card applicant was denied a credit line (e.g. income too low, credit score too low) and/or a small number of changes they can make (such as "increase income by $10,000" or "increase FICO score by 30 pts") such that they would be approved for the credit line in the future.

It can be desirable to place constraints on CFEs. For example, a constraint may specify that the changes included in the CFEs should be actionable and not require modifications that are impossible, such as changing one's race. Alternatively or in addition, a constraint may specify that the changes should be sparse (e.g., include changes to only a few features) and involve only a small and readily-implemented amount of change. Alternatively or in addition, a constraint may specify that the changes should adhere to causal relationships, e.g., taking into account that increasing education may be associated with an increase in age. Alternatively or in addition, a constraint may specify that the output recommendation should be realistic and similar to other applicants.

One or more embodiments of the present disclosure generate "fast" counterfactual explanations for multiple input datapoints, without separately optimizing each counterfactual explanation. The fast counterfactual explanations are generated in a model-agnostic and black-box manner. The generated counterfactuals adhere to a training data manifold, respect causal relations, and are sparse.

As previously mentioned, in some instances, the generated counterfactual explanations can provide recommended remedial actions for a specific user to take to achieve a goal. Each counterfactual explanation can recommend a single remedial action, and where multiple remedial actions are used to achieve a desired state, an equal number (or approximately equal number) of counterfactual explanations can be generated to guide the user, step-by-step, towards a desired state. In some implementations, the generated counterfactuals can be delivered to the user via a display of a compute device associated with the user. Additionally or alternatively, the generated counterfactuals can be delivered to the user via an audio output device associated with the user. The counterfactuals can be delivered to the user in response to a trigger, such as the generation of a counterfactual explanation, or a selection via a graphical user interface (GUI) to receive a counterfactual explanation. In some implementations, the generated counterfactual can be delivered to a third-party different than the user, and the third-party can choose how/when to provide the recommended remedial action(s) to the user.

FIG. 1 is a diagram showing example counterfactual explanations for a datapoint, according to an embodiment. As shown in FIG. 1, the datapoint (labelled "X") was classified in the negative class (labelled "−"), to the right of the decision boundary. CF1 and CF2 are two counterfactuals for the datapoint X, which the model (i.e., classifier) classifies in the positive class (labelled "+"), to the left of the decision boundary. Several counterfactuals can be generated for a single datapoint, and the counterfactuals can differ in their closeness or proximity to the original datapoint and other desirable properties.

In one or more embodiments, a system computes counterfactual explanations for any input datapoint from a dataset that has been used to train the reinforcement learning (RL) agent. In some implementations, the counterfactual explanations are computed automatically in response to the system receiving the input datapoint (i.e., without need additional human input).

In one or more embodiments, the system uses only black-box access to the underlying classifier/model, and may not require specific knowledge of the underlying algorithm, or of model gradients or associated information. Such systems may only retrieve new scores/predictions from the model for any new (potential) inputs.

Figure 2:
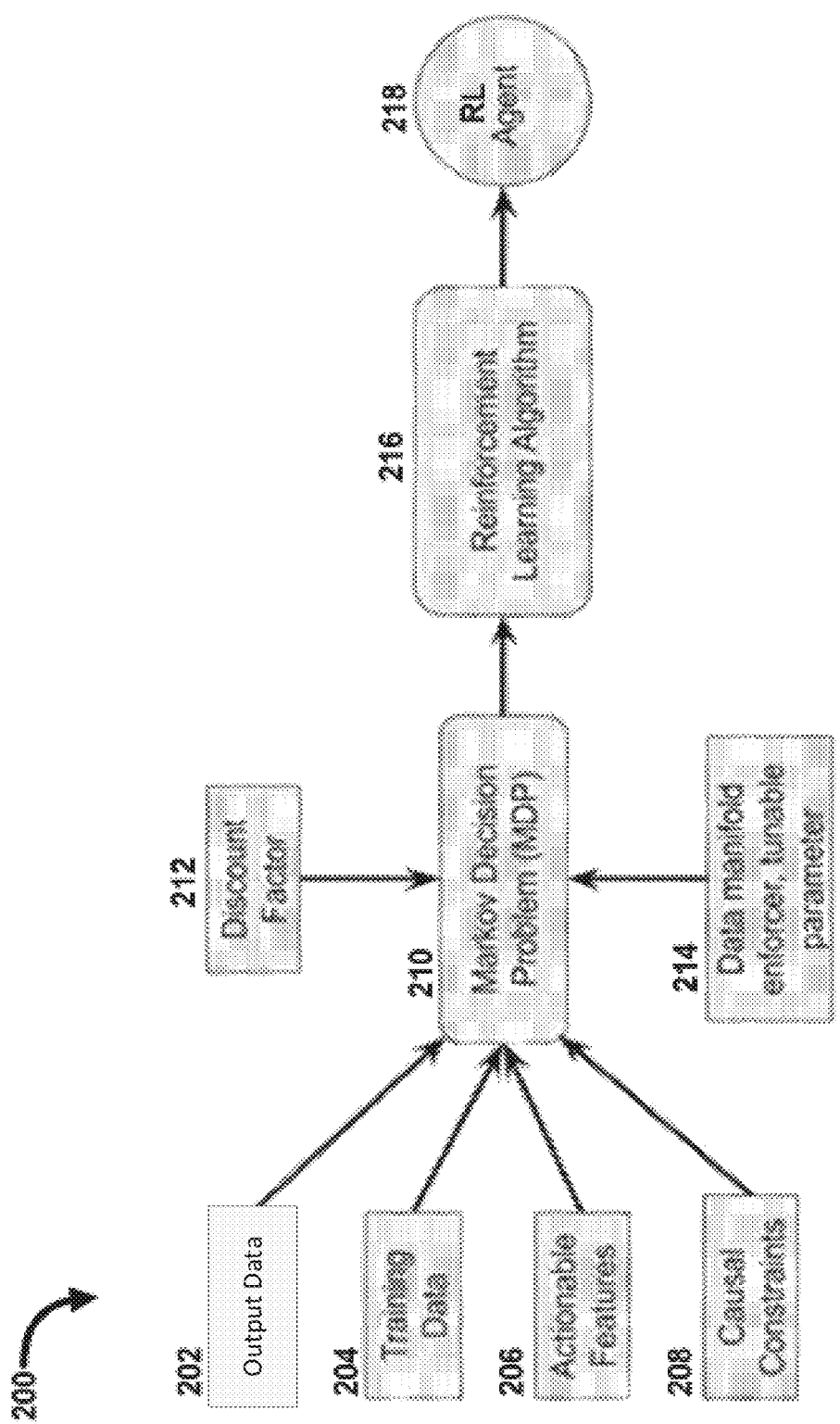
FIG. 2 is a diagram showing information flows in an example system architecture that trains an RL agent on a given dataset, according to an embodiment.

In one or more embodiments, a system converts a CFE-generation problem for a dataset into a Markov Decision Process (MDP), and then uses a RL algorithm(s) to train an RL agent that learns a policy. The RL agent can be a software agent. The RL agent can be situated in a computer environment that identifies an action(s) that one or more users can take to achieve a goal. Upon identifying that action(s), the RL agent can share the action(s) to the one or more users to cause those one or more users to be made aware of and/or follow the action(s). The RL agent can be autonomous, work with other RL agents, and/or work with a human(s). When in use, the RL agent can generate a counterfactual for any datapoint that belongs to the dataset distribution. The MDP can include at least five elements (or components or portions or segments): state space, action space, transition function, reward function, and discount factor. For a given dataset, the state space includes all possible values that an input datapoint can take, which is the cartesian product of the possible values each feature can take. Note that the features themselves can be either numerical or categorical. Categorial features can refer to features whose values are confined to a discrete set of possibilities (e.g., green, red, or blue), while numerical features can refer to features whose values can take on any continuous number. Examples of categorical features can be houses owned, number of children, number of college degrees earned, and speeding tickets received. Examples of numerical features can be grade point average (GPA), global positioning system (GPS) coordinates, body fat percentage, and blood alcohol level. The action space includes the changes that the RL agent can take. Possible actions are specific to each feature. This is because some features are categorical, while others are numerical, and some features are actionable, while others are not. The transition function takes, as inputs, a datapoint and an action, and returns the transformed datapoint. The reward function is the reward that the RL agent receives for the specific task of generating counterfactuals. Rewards can be provided in a continual/continuous manner, or in a one-time manner. In some embodiments, the system trains RL agents using both types of rewards. The MDP formulation can be performed as an intermediate step during operation of the system, as shown in FIG. 2. Additional discussions related to generating a MDP from a CFE-generation program for a dataset are also discussed with respect to FIGS. 5A-5D and FIG. 6.

Training RL Agents

FIG. 2 is a diagram showing information flows 200 in an example system architecture (or system) that trains an RL agent 218 on a given dataset, with other desirable properties, according to an embodiment. The system can generically handle both categorical features and numeric features. The RL agent 218 is configured to learn an effective policy over discrete and continuous input spaces and action spaces. The system allows users to specify (e.g., by interacting with a user interface, such as a graphical user interface (GUI) operably coupled to or included in the system) immutable features (e.g., birthplace, birthdate), mutable but not actionable features (e.g., FICO score), and actionable features (e.g., income, education level, weight). The action space is modified accordingly, to only change the actionable features. Due to causal constraints, however, the mutable but not actionable features can also change as a result of an action, despite their not being directly modifiable. The actionable features 206 are provided (e.g., in the form of a list) as inputs to the system and to the MDP 210.

The system also allows users to specify (e.g., via the GUI) causal constraints 208 and relationships between features that are to be maintained. For example, a user can specify that the feature "age" cannot decrease, and if the feature "education level" increases, an associated "age" increases. Additionally or alternatively, the causal constraints 208 can be generated automatically based on universally-known causal relationships between features, and do not require input from a user. For example, a user cannot get five additional years of work experience and stay the same age. These causal relationships can be transformed into the MDP 210 as part of the transition and reward function, and the RL agent 218 will respect them when generating counterfactuals. The causal constraints 208 and the relationships between features that are to be maintained are provided as inputs to the system and to the MDP 210. Other inputs to the MDP 210 include output data 202 from a classifier and/or training data 204 (discussed further below).

The system also allows users to specify, using a tunable parameter 214, the extent to which the offered explanations must be similar to data observed in the model's training set (e.g., training data 204, or "training data manifold"). The closeness to existing data (or "data manifold adherence") can be ensured by adding a term to the reward function of the MDP 210. When the value of the tunable parameter 214 is high, the RL agent 218 may be significantly penalized if it moves away from the data manifold, and vice versa when the value of the tunable parameter 214 is low. The tunable parameter 214 is provided as an input to the MDP 210. One or more discount factors 212 can also be provided as inputs to the MDP 210. The output of the MDP 210 is provided as an input to the RL algorithm 216 to train the RL agent 218 for quickly calculating CFEs.

The system can be implemented as one or more compute devices (e.g., computers or servers), each of which can include a processor and a memory storing processor-executable instructions to implement processes and methods described herein, including to generate and render (e.g., in a display) a GUI. When the system includes multiple compute devices, the compute devices may be in wireless or wired communication with one another over a communications network.

In one or more embodiments, the system prescribes sparse actions. For example, the system only takes one action which generally modifies only one feature (though sometimes, due to causal constraints, one action can modify more than one feature). The system then returns sequences of actions or a path that will land the input datapoint into a counterfactual state.

The transition function of the system can handle (or take into account) stochasticity. For example, increasing an education level by 1 can cause an increase in age by 1 with a probability of 30%, an increase in age by 2 with a probability of 20%, and/or an increase in age by 3 with a probability of 50%.

As noted above, inputs to the system can include (or access or remotely access) output data 202 from a pre-trained classification model (i.e. classifier) for which the user desires counterfactual explanations, and a training dataset 204 (e.g., the dataset on which the classifier was trained). Although counterfactual explanations can be generated in a black-box manner, where knowledge of how a classifier arrives at its prediction (e.g., output data 202) is not necessary, in some implementations, the system may also access the prediction method (i.e., how the output data/prediction is arrived at) of the classifier for scoring/predicting new inputs. That way, an RL agent (e.g. RL agent 218) can predict/verify outputs from hypothetical inputs to the classifier using the classifier's prediction method prior to generating a recommended remedial action. This can help to avoid, for example, the RL agent recommending a remedial action that doesn't actually help a user to achieve a desired state. Optionally, inputs to the system can also include an enumeration of immutable features that cannot be changed by the users of the system (e.g., race, birthplace), and mutable but not actionable features (e.g., FICO score). Optionally, inputs to the system can also include a causal graph representing relationships between features that form nodes of the graph. These nodes can include features that do not occur in the dataset (e.g., time). Instead of a causal graph, causal constraints between a feature or two features can also be provided to the system (e.g., age cannot decrease, or an increase in education level causes (or should track) an increase in age). Optionally, inputs to the system can also include a tool to measure the distance of a datapoint from the aforementioned dataset manifold (e.g., a k-nearest neighbor (KNN) classifier or a variation autoencoder (VAE, trained on the dataset)).

For discrete state and action spaces, the RL agent 218 can be trained using policy iteration or value iteration, which trains the RL agent 218 until optimality. For continuous state and action spaces, the RL agent 218 can be trained using policy gradient and other Deep RL approaches like actor-critic methods. The system outputs an RL agent 218 ("trained" RL agent) that has learned an effective policy to generate counterfactual explanations. CFEs can be generated for multiple individuals and/or multiple CFEs can be generated for an individual using the RL agent 218 without having to separately optimize the RL agent 218 for each individual and/or CFE.

RL Agent Operation

Figure 3:
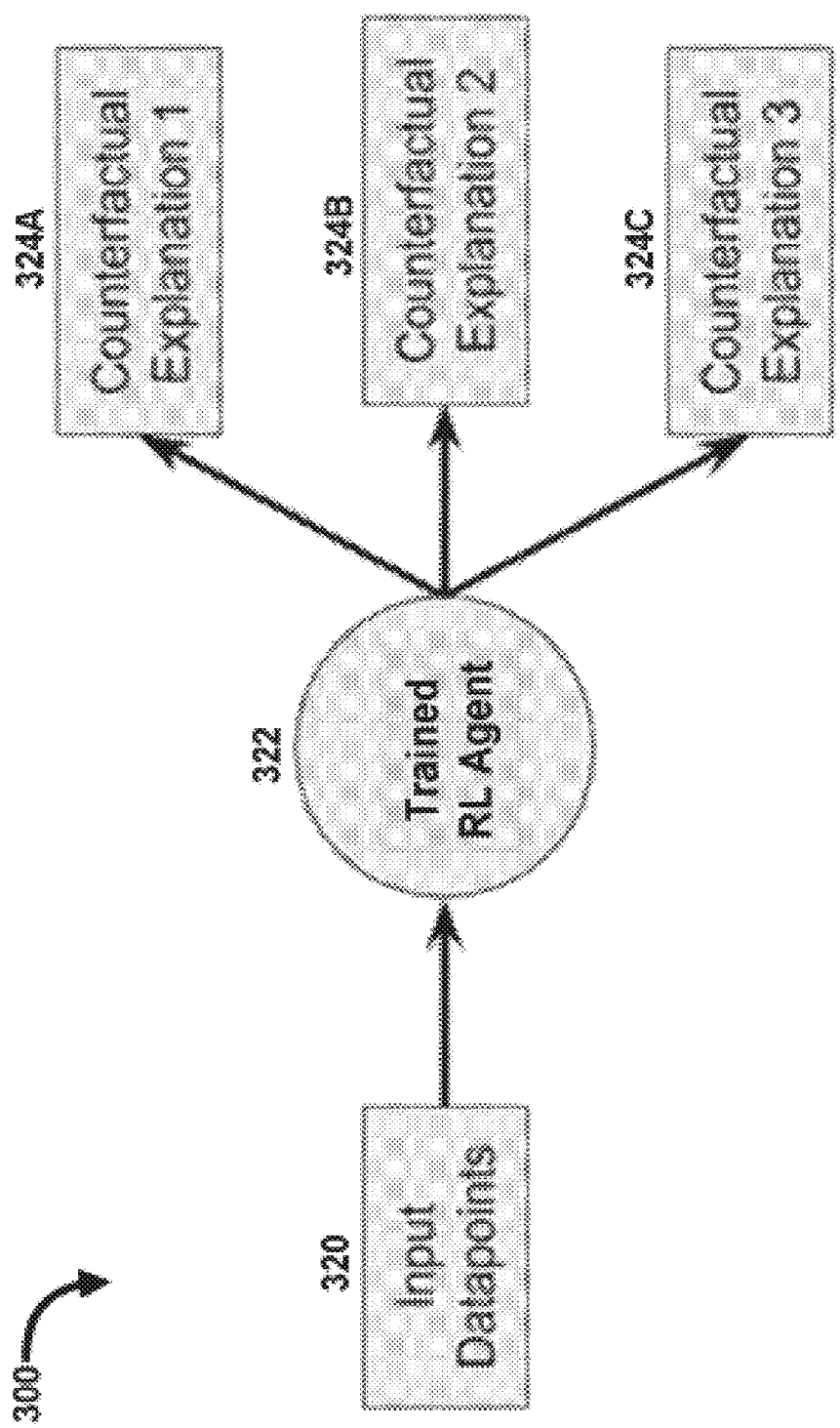
FIG. 3 is a diagram showing information flows during operation of a trained RL agent, according to an embodiment.

During operation of an RL agent, due to the stochastic nature of the transition function, the RL agent may output multiple sequences of paths for a given input datapoint, each leading to a different counterfactual state. An example showing the generation of multiple output sequences of paths is shown in the diagram of FIG. 3, which depicts information flows 300 during operation of a trained RL agent, according to an embodiment. As shown in FIG. 3, input datapoints 320 are provided to the trained agent 322 (e.g., the RL agent 218 of FIG. 2), and the trained RL agent 322 outputs counterfactual explanation 1 (324A), counterfactual explanation 2 (324B), and counterfactual explanation 3 (324C).

During operation of an RL agent, when an input datapoint is provided to the RL agent, the RL agent outputs a sequence of recommended actions that will allow the user to get from the initial outcome to the desired outcome. The actions will modify the input datapoint until it reaches a counterfactual state, as shown in the diagram of FIG. 4, which shows information flows 400 during generation of a counterfactual datapoint 440, according to an embodiment. As shown in FIG. 4, the dataflow 400 includes receiving an input datapoint 430, and providing the input datapoint 430 to a trained RL agent 432. The trained RL agent 432 generates and outputs an output datapoint 433, which is provided to a classifier 434. The output from the classifier 434 is evaluated at 436, to determine whether the output belongs to a desired class. If the output does belong to the desired class, the output from the classifier 434 is provided/output as a counterfactual datapoint 440. If the output does belong to the desired class, the output from the classifier 434 is fed back, as an output datapoint 438, to the trained RL agent 432. The dataflow 400 of FIG. 4 may iterate until all counterfactual datapoints 440 associated with the input datapoint 430 and satisfying the desired class 436 have been identified.

FIGS. 5A-5E will be used to facilitate additional discussion related to translating a given CFE problem in an MDP. After translating a given CFE problem into an MDP, one or more RL algorithms can be used to generate an RL agent that can learn a policy that achieves a desired state (i.e., terminal state) in an optimal manner.

Figure 5A:
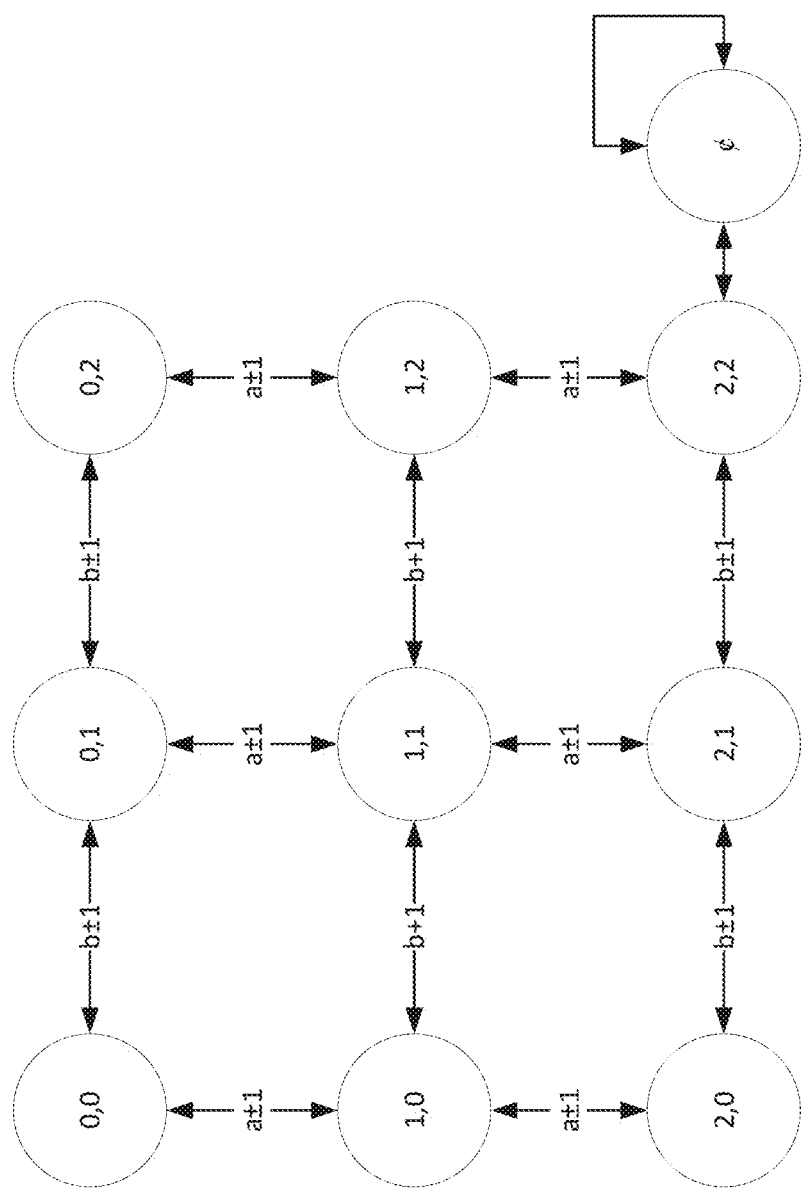
FIG. 5A is a diagram showing a first Markov Decision Process (MDP) for a given counterfactual explanation (CFE) scenario, according to an embodiment.

A state space (S) refers to all possible states that can exist for a group of one or more features. FIG. 5A illustrates nine potential states for two features based on incrementing or decrementing either feature. In this example, a dataset consists of two features a and b, each of which have possible values 0, 1, or 2. In such a case, as shown in FIG. 5A, feature a and feature b, along with their possible values, can create a space state including states: (0,0) where a=0 and b=0; (1,0) where a=1 and b=0; (2,0) where a=2 and b=0; (0,1) where a=0 and b=1; (1,1) where a=1 and b=1; (2,1) where a=2 and b=1; (0,2) where a=0 and b=2; (1,2) where a=1 and b=2; and (2,2) where a=2 and b=2.

To navigate from a state to a subsequent state, a feature value can be adjusted. The action state (A) includes all potential ways the feature values can be adjusted. In some implementations, as shown in FIG. 5A, feature values can be incremented (i.e., a+1, or b+1) via an action and/or decremented (i.e., a−1, or b−1) via an action. For example, at state (0,0), action a+1 can cause a state transition to (1,0). Thus, the action space for the scenario discussed with respect to FIG. 5A includes a+1, b+1, a−1 and b−1.

Another component of the MDP is the transition function (T), which can represent the resulting state from performing an action from the action space on a state from the space state. In some implementations, such as the scenario shown in FIG. 5A, the transition function can be represented by $T: S \times A \rightarrow S'$. This denotes that if action A in state S is taken, then the resulting state will be state S'. The aforementioned transition function is deterministic because there is a 100% chance that taking the action A in state S will cause a transition to state S', and a 0% chance of ending up in any other state. In some implementations, however, the transition function can be probabilistic. In probabilistic transition functions, there is a probability distribution over destination states. This can be denoted by $T: S \times A \times S' \rightarrow \{0,1\}$ with an additional constraint of $\forall S, \forall A \Sigma_{S'} T(S, A, S')=1$ (adhering to probability laws). That is, there can be only one destination state (S') that with T(S, A, S')=1 for all start states S and each action A one can take from S. This also implies that $\forall S'' \neq S'$, and T(S, A, S'')=0.

Another component of the MDP can be the reward function ($R_1$), which can generate a reward value (R'). Taking an action can cost some amount (negative reward), and reaching desirable states can result in a positive reward. For example, taking any action from any state could cost a constant amount of 1, and reaching any of the states could give 0 reward, except for a dummy state (0) which can give a positive reward of +10 when reached from the terminal state. As shown in FIG. 5A, the dummy state ¢ can only be reached from (2,2). Once in the dummy state ¢, all subsequent actions lead back to the dummy state ¢ itself, and there is a 0 cost for taking them. The state space, action space, transition function, and reward function can constitute the environment that can be explored by an RL agent. In some implementations, the aim can be to learn a policy that reaches the dummy state ¢ from any state taking the least number of actions. In some implementations, the aim can be to learn a policy that reaches the dummy state ¢ from any state achieving the best reward (e.g., lowest negative reward, highest positive reward, reward score within a predetermined range).

In some implementations, a discount factor ($\gamma$) can be used, which can be multiplied by a future reward value. The discount factor can be used to avoid infinite exploration horizons, and can be a value between 0 and 1, where 0 means that only immediate reward is valued, and 1 means that any future reward is valued equal as now. Thus, any value for the discount factor that is between 0 and 1 trades-off between immediate and future reward. Said another way, the discount factor can represent a relative prioritization by an RL agent of short-term reward relative to long-term reward.

In summary, the MDP shown in FIG. 5A includes: (1) a state action space S={0,0},{0, 1},{0, 2},{1, 0}, . . . , (2) an action space A=a+1, b+1, a−1, b−1, (3) a transition function $T: S \times A \rightarrow S'$, (4) a reward function $R_1: S \times A \rightarrow R'$, and (5) a discount factory $\gamma \in [0, 1)$.

Figure 5B:
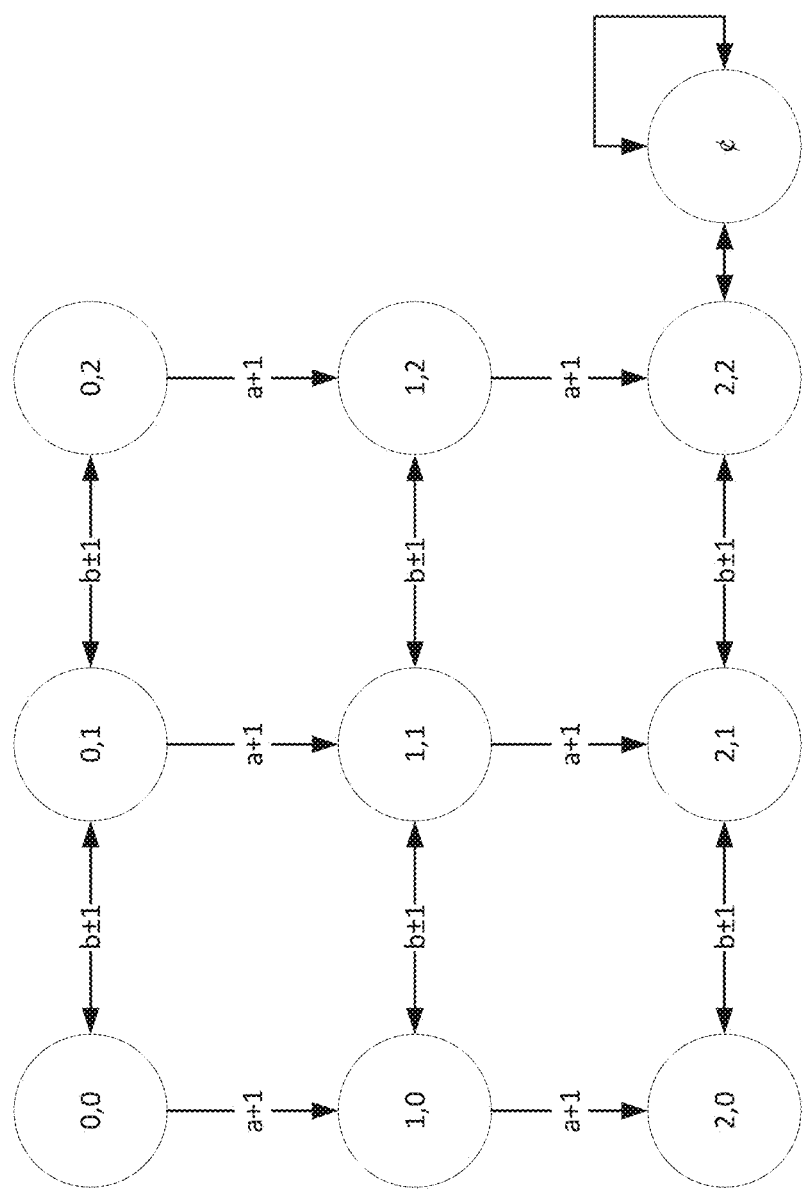
FIG. 5B is a diagram showing a second MDP for a given CFE scenario, according to an embodiment.

FIG. 5B shows another example of an MDP generated for a given CFE problem. In this example, one of the two features is age. This adds a constraint because age cannot decrease. For translating the CFE problem associated with this dataset into an MDP, any transition which decreases age is not allowed. This can be captured by the transition function. Letting feature a denote age, it can be seen in FIG. 5B that the edges which act on feature a have now become unidirectional, implying that the value of feature a cannot decrease. Taking the action a−1 at any state ends up being in the same state, albeit with a cost of 1.

Figure 5C:
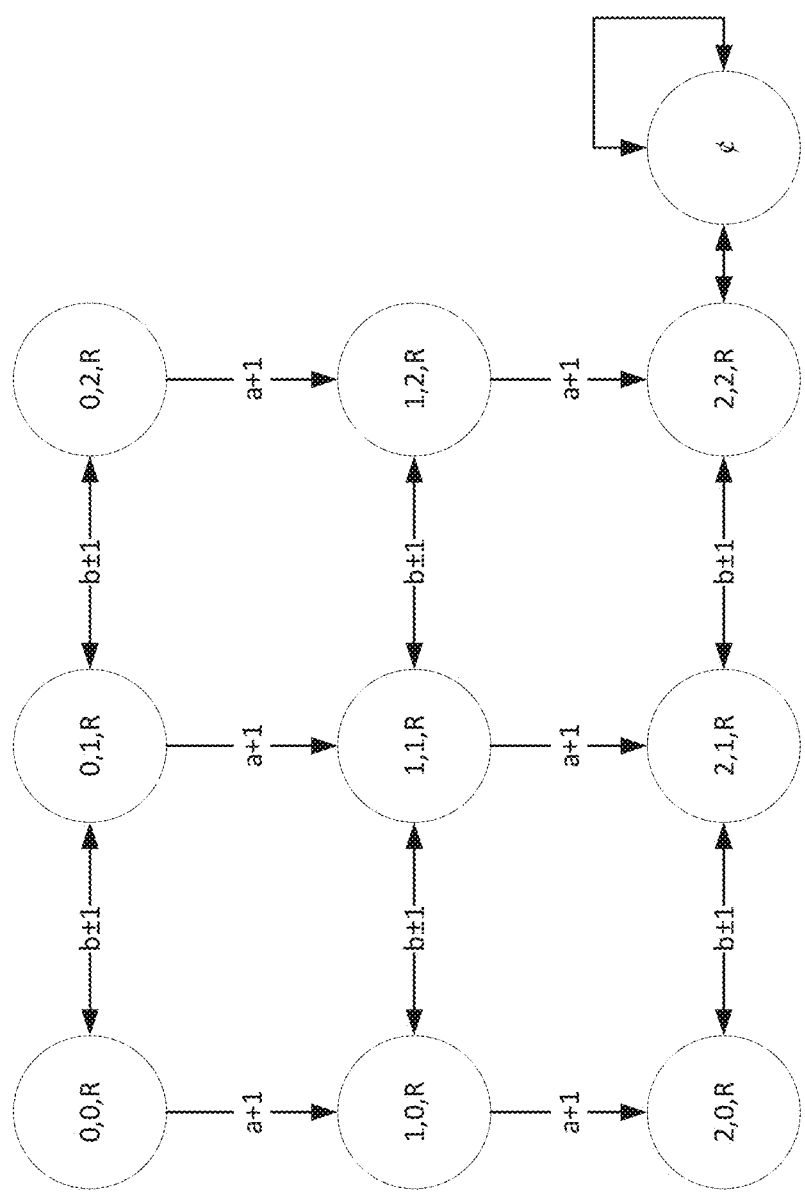
FIG. 5C is a diagram showing a third MDP for a given CFE scenario, according to an embodiment.

As another example, referring now to FIG. 5C, a dataset (i.e., training dataset) includes three features, one of which is immutable (e.g. race). Feature a still represents age and carries its non-decreasing constraint. An immutable feature can't be changed using any action, and can be encoded in the MDP by having no action for the immutable feature. As can be seen in FIG. 5C, the state space in the MDP includes three values for each feature, where feature R represents race, and feature a represents age. Note that none of the actions affect the value of feature R. The reward function in this case is similar to that in FIG. 5A, where there is a negative reward to take any action, and a positive reward for reaching the dummy state ¢ from the terminal state. The terminal state can lead into a dummy state ¢, where any subsequent action once in the dummy state ¢ ends up in the same dummy state ¢. Defined formally, letting race (R) be 0 or 1, the MDP in FIG. 5C includes: (1) state space S={0, 0, 0}, {0, 1, 0}, {0, 2, 0}, {1, 0, 0} . . . ; (2) action space A=a+1, b+1, a−1, b−1; (3) transition function T:S×A→S; (4) reward function $R_1$:S×A→R'; and (5) discount factory γ∈[0,1).

Figure 5D:
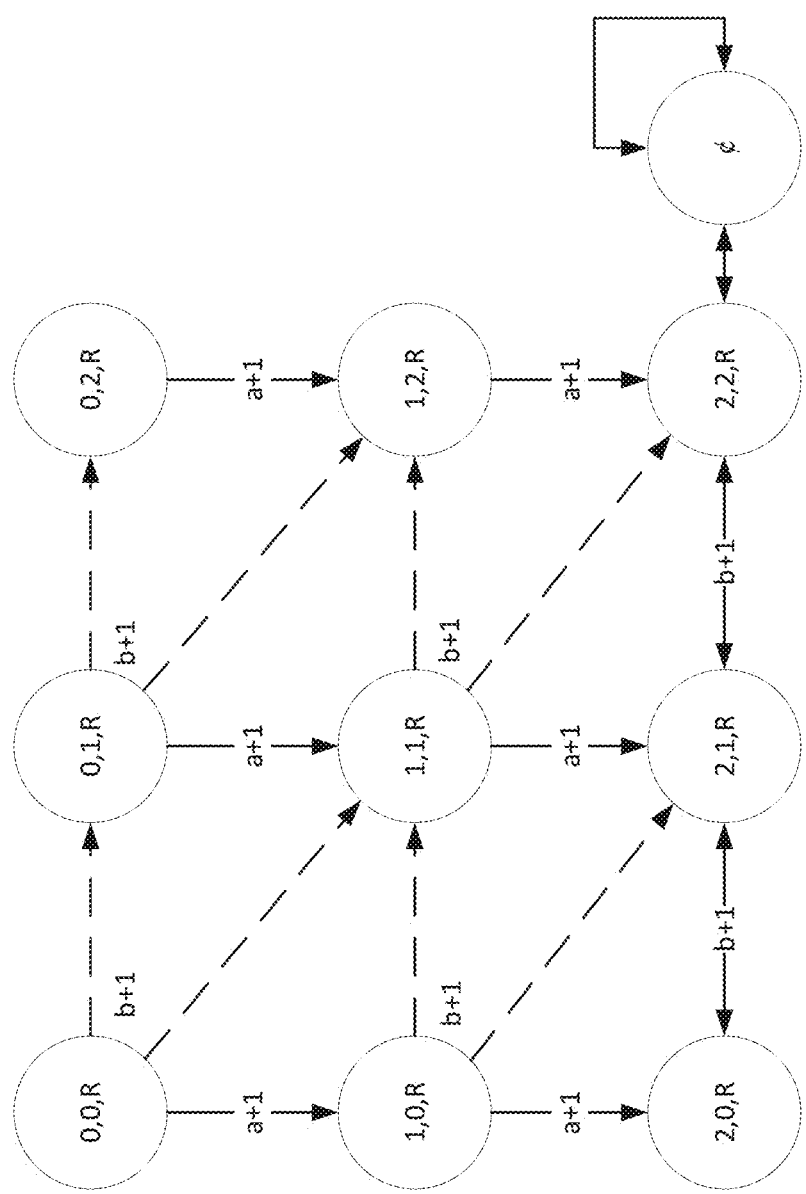
FIG. 5D is a diagram showing a fourth MDP for a given CFE scenario, according to an embodiment.

The example shown in FIG. 5D is similar to the previous example shown in FIG. 5C, except that the second feature b now represents education level. Therefore neither feature a (i.e., age) nor feature b can decrease. A causal relation between education level and age implies that increasing the education level can also increment one's age group, with a probability of, for example, 50%. Such relations can be inferred by a causal model of a data generation process. Therefore the transition function for the MDP representing the counterfactual explanation for this dataset is stochastic. When the education level is increased by 1, there can be, for example, a 50% chance that the age feature value will remain the same, and a 50% chance that it will increase by one. The probabilistic transition to two destination states is shown in FIG. 5D via the dashed lines. As can be seen, incrementing feature b by one can cause a transition from a first state to second state where feature a is also incremented by one, or a third state where feature a remains the same. As in the previous example in FIG. 5C, the value of race is immutable. Defined formally, the MDP components include: (1) state space S={0,0,0}, {0,1,0}, {0,2,0}, {1,0,0} . . . ; (2) action space A=a+1, b+1, a−1, b−1; (3) transition function T:S×A×S'→{0,1} such that ∀S,∀A$\Sigma_{S'}$T(S,A,S')=1; (4) reward function $R_1$:S×A→R'; and (5) discount factory γ∈[0, 1).

In all the examples discussed with respect to FIGS. 5A-5D, there was a constant cost to taking any action (e.g., 1), and reaching any state besides the dummy state ¢ gave zero reward/did not give a positive reward. In some implementations however, reaching certain states can cause a more negative reward compared to other states. This can help to avoid an RL agent recommending a counterfactual explanation that leads to an undesirable, unrealistic and/or unactionable explanation state (e.g., get a new Bachelor's degree in one year, increase salary by $500,000 in six months). The MDP can account for such undesirable, unrealistic, and/or unactionable explanations by having a modified reward function. For instance, if an action is taken that ends up in an undesirable, unrealistic, and/or undesirable state, a negative reward (e.g., penalty of −5 reward points) can be enforced (rather than no reward). Otherwise, reaching the dummy state ¢ still carries the +10 reward, other states reward 0, and there is a constant cost to take any action (e.g., −1). A RL agent learning in this environment would ideally learn to avoid the unrealistic states and take actions that go to the terminal state. In this situation, the agent can learn to not take the shortest path because it goes through an unrealistic state. In some implementations, a K-Nearest Neighbor algorithm can be used to find the appropriate penalty for landing in any state.

As another example, considering the scenario laid out in FIG. 5D, the reward function was the same for all features. In some instances, however, it may be harder to change one feature compared to another (e.g. it might be easier for someone to wait to increase their age compared to getting a new degree). Such a scenario could be accounted for by posting higher costs to change features harder to change, and vice-versa for features easier to change.

FIG. 6 shows an example of an algorithm that can be used to generate an MDP for a given CFE problem setup, according to an embodiment. The algorithm includes a state space, action space, transition function, reward function, and discount factor. Based on the values a feature in a given dataset can take, the features can be categorized into numerical or categorical features.

As shown in line 1, the state space S constitutes the product of the real values for numerical features (denoted $R^{[Num]}$) and the cross product of the discrete values taken by all categorical features $$\left( \text{denoted by} \underset{i=1}{\overset{|Cat|}{\times}} Cat_i \right).$$

Based on the actionability and mutability of a feature, the features in a dataset can be categorized into actionable, mutable but not actionable, or immutable. Actionable refers to features that an individual can directly changes (e.g., income, education level, age). Mutable but not actionable refers to features that are mutable, but cannot be modified directly by an individual. Mutable but not actionable features can change as an effect of change in other features (e.g., credit score cannot be directly changed, but it can change as a result of changes in other features like income and loan amount). Immutable refers to features whose values can never be changed for an individual (e.g., race).

As shown in line 2, actions are defined for only the actionable features. The actionable features of the numerical kind can increase or decrease their value by any amount, where the amount of increase and/or decrease to reach a subsequent state, terminal state, and/or dummy state can be known by the RL agent via the RL learning algorithm and MDP before the RL agent is generated. In some implementations, the amount of increase and/or decrease to reach a subsequent state, terminal state, and/or dummy state can be pre-set by a user and adjusted arbitrarily as desired. For the actionable features of the categorical kind there are also two features, but they increase or decrease the value of the features by one only. This can allow the categorical features to take discrete values.

The transition function begins at line 3, where the transition function finds the modified state when an action is taken in a current state. This function can also incorporate causal relations that define relationships between features to ensure that features are updated properly. Since knowing the complete and exact causal relations in terms of a structural causal graph (SCM) is not always desirable, the causal relations can be fed in the form of unary (Un) and binary (Bin) constraints to the transition function. Unary constraints are derived from property of one feature (e.g., age can't decrease) and binary constraints are derived from the relation between two features (e.g., if education increases, age increases).

In some implementations, for producing sparse counterfactuals, only one feature is modified at each step (i.e., for each counterfactual). Therefore each action can be indexed by the feature the action is modifying (e.g. action $A_j$ modifies feature j). Unary constraints can decide if the chosen action is permissible for feature j. If permissible, the new state with the value of updated feature j is produced, as shown in line 7. If not permissible, the current state is returned, as shown in line 9. For permissible actions that modify feature j, the algorithm can check if other features are affected due to the change in value. If yes, the change in other features is produced by using the binary constraints function, as shown in line 4.

The reward function begins at line 17, which prescribes an appropriate reward for a given state and action. The reward function can include three portions. For the first portion, given a current state (CurrState), action ($A_j$), and training dataset (D), a user-provided distance function (DistF) can return the appropriate cost to take that action, as shown in line 18. The distance function can either be L1/L2 norm of the change produced by the action (after the feature is normalized), or a function that takes into account the cumulative distribution function (CDF) of the specific feature that action is modifying. The latter function can account for facts like changing a feature from the 90 to 95 percentile can cost more than changing it from 50 to 55 percentile. Along with action specific costs, there is a constant cost (e.g., of −1) to take any action. This can be added to incentivize the RL agent to take shorter paths and disincentive actions that produce no change in feature values. The second portion of the reward function penalizes the final state if it is away from the data manifold, as shown in line 20. This can be determined using a K-Nearest Neighbors (KNN) classifier trained on the training dataset. Given the final state (FinalState), the KNN classifier and the number of neighbors (K) from which the distance of the final state has to be calculated, the KNN classifier can output the average distance from the K neighbors. This is multiplied by a factor $\lambda$. Both K and $\lambda$ are user-provided and tunable hyper-parameters. The third portion of the reward function rewards the RL agent if the trained model (f) produces the desired label for the final state, as shown in line 22. Otherwise, there is no reward. This encourages the RL agent to learn the policy that quickly get the desired label for a state (datapoint).

Another component of the algorithm shown in FIG. 6 is the discount factor $\gamma$, which is a tunable parameter that, given a specific problem setting, can come from the user of the RL policy. The discount factor can help to define how to balance trades-off between immediate and future rewards. In some implementations, however, the discount factor can be pre-set to a default value (e.g., 0.5, 0.99) if a user has not specified a specific value.

FIG. 7 shows a flowchart of a method for generating a single RL agent, and using that single RL agent to share multiple counterfactual explanations to multiple different users, according to an embodiment. At 702, a processor generates a MDP based on (1) output data from a classifier, (2) training data associated with the classifier, and (3) at least one actionable feature. The MDP includes a state space, an action space, a transition function, a reward function, and a discount factor. Note that output data from the classifier can be used to generate the MDP, and that knowledge associated with the inner-workings of the classifier are not required. In some implementations, the at least one actionable feature is a numerical actionable feature, a categorical actionable feature, or a combination thereof. In some implementations, the MDP is further based on at least one causal constraint, which can include a unary constraint, binary constraint, or a combination of both. In some implementations, the generating the MDP at 702 can be further based on a tunable parameter associated with the reward function (e.g., tunable parameter 214).

At 704, the processor applies a RL model to the MDP to generate a RL agent. Any appropriate RL model can be used, such as policy gradient or any other Deep RL approach (e.g., actor-critic methods). The RL agent can be configured to maximize the reward function (i.e., get the best reward, minimize a penalty function).

At 706, the processor receives, at the RL agent, first data associated with a first user. In some implementations, the first data can be used to determine a state in the state space that the first user is currently at. This can look like, for example, displaying a series of questions representing potential features to the first user (e.g., What is your salary? What is your age?), and receiving answers to the series of questions representing feature values (e.g., $50,000/year, 25 years old). The first data can also include tunable parameter values.

At 708, the processor generates, using the RL agent, at least one first CFE based on the first data. The RL agent generated at 704 can generate the at least one first CFE using the first data associated with the first user received at 706 and the MDP generated at 702. In some implementations, the first data is a single dataset, and the at least one first CFE includes a plurality of different CFEs generated from the single dataset.

At 710, the processor receives, at the RL agent, second data associated with a second user different from the first user. Similar to 706, the second data can be used to determine a state in the state space that the second user is currently at, as well as factor in any tunable parameters.

At 712, the processor generates, using the RL agent, at least one second CFE based on the second data. The RL agent generated at 704 can generate the at least one second CFE using the second data associated with the second user received at 710 and the MDP generated at 702. In some implementations, the at least one second CFE includes a plurality of different CFEs.

At 714, the processor causes transmission of a representation of the at least one first CFE to a compute device of the first user. If the first user was denied a desired state (e.g., receiving a loan), the at least one first CFE can include a representation of a reasoning behind the denial (e.g., income too low, age too low). In some implementations, the at least one first CFE can also include a representation of at least one recommended remedial action. By the first user performing the recommended remedial action, the first user can become closer to achieving a desired state. If the at least one recommended remedial action is multiple recommended remedial actions, the multiple remedial actions can be shown to the first user all at once, one at a time as the first user completes each remedial action, or a combination thereof.

At 716, the processor causes transmission of a representation of the at least one second CFE and at least one recommended remedial action to a compute device of the second user. The second user can be different than the first user, or the second user can be the same as the first user. Based on the current state of the second user at the MDP generated at 702, the RL agent can generate the at least one second CFE to indicate why the current state is not at a desired state, and/or what action(s) can be performed to get closer to the desired state from the current state.

Although in method 700 each step was performed by a single processor, in some implementations, method 700 can be performed across multiple processors (which can be local, remote, or a combination of both). Furthermore, in some implementations, the steps in method 700 can be performed in a different sequence and/or in parallel. For example, 706, 708, 714 can performed while 710, 712, 716 is also performed.

Figure 8:
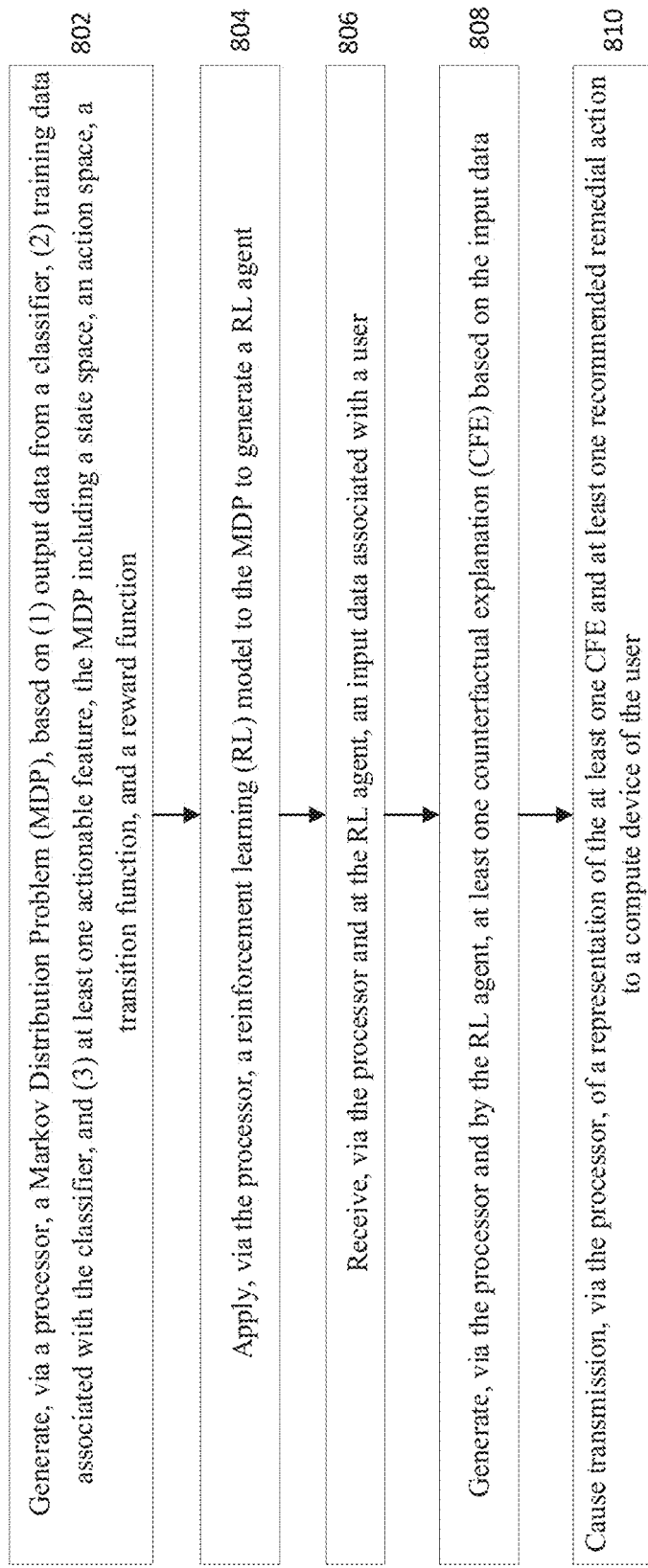
FIG. 8 shows a flowchart of a method for generating a MDP, generating an RL agent based on the MDP, and generating at least one CFE using the RL agent, according to an embodiment.

FIG. 8 shows a flowchart of a method for generating an RL agent that can cause transmission of at least one counterfactual explanation to a compute device associated with a user, according to an embodiment. At 802, a processor generates a Markov Decision Process (MDP), based on (1) output data from a classifier, (2) training data associated with the classifier, and (3) at least one actionable feature. The MDP includes a state space, an action space, a transition function, and a reward function. At 804, the processor applies a reinforcement learning (RL) model to the MDP to generate a RL agent. At 806, the processor receives, at the RL agent, an input data associated with a user. At 808, the processor generates, using the RL agent, at least one CFE based on the input data. At 810, the processor causes transmission of a representation of the at least one CFE and at least one recommended remedial action to a compute device of the user.

In some implementations of method 800, the MDP can further include a discount factor (e.g., discount factors 212) representing a relative prioritization by the RL agent of short-term reward relative to long-term reward. The discount factor can be user-defined and/or pre-set to a default value. If user-defined, the discount factor can be received at 806 as part of the input data. In some implementations of method 800, the at least one actionable feature includes multiple actionable features, and the at least one CFE recommends modifying a single actionable feature from the multiple actionable features.

In some implementations, the state space includes a dummy state, terminal state (i.e., desired state), and non-terminal states, where the terminal state transition to a dummy state. The reward function can define an association between at least one of: the terminal state and a positive reward, the terminal state and a neutral reward, the transition from the terminal state to the dummy state and a positive reward, the dummy state and a positive reward, the dummy state and a neutral reward, performing the at least one actionable feature and a negative reward (where the amount/extent of negative reward can vary and/or be similar for different actionable features), the non-terminal state and a neural reward, or the non-terminal state and a negative reward (where the amount/extent of negative reward can vary and/or be similar for different non-terminal states). In some implementations, the only positive reward is associated with transitioning from the terminal state to the dummy state.

Figure 9:
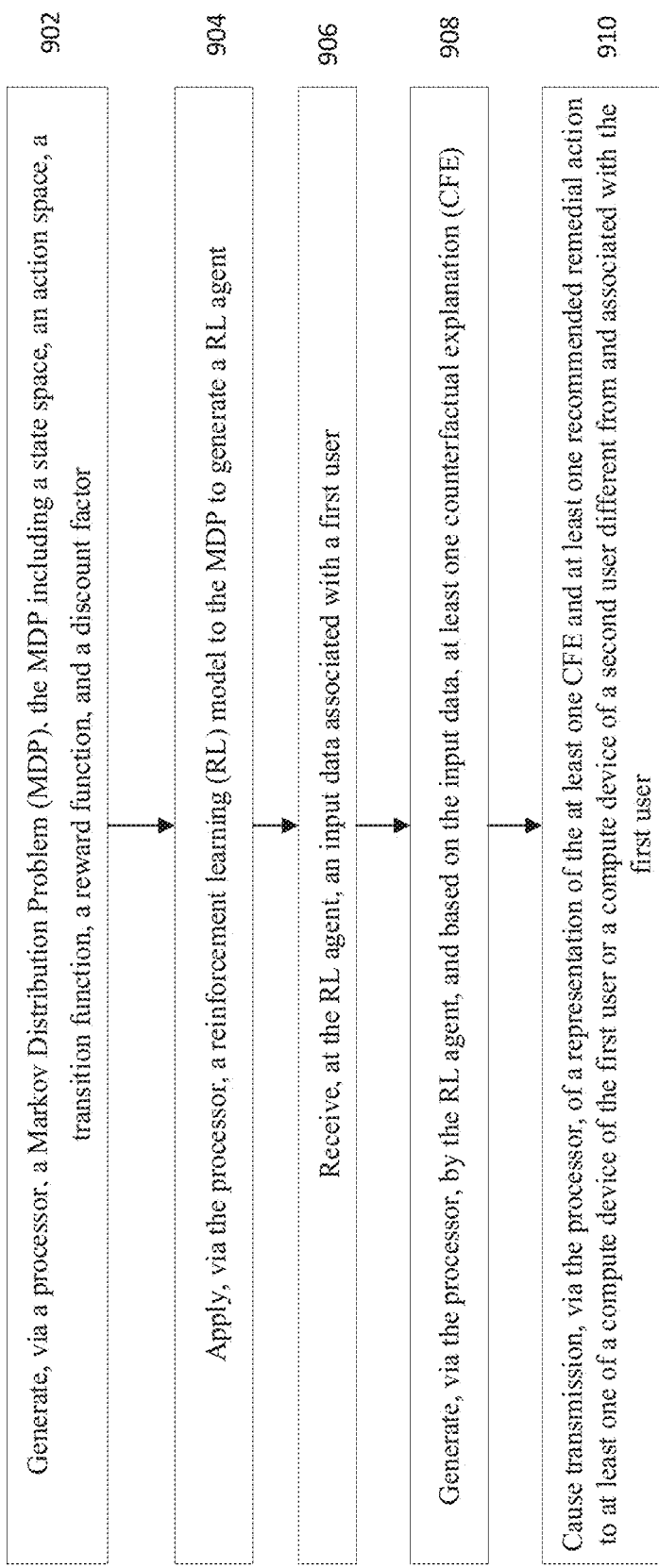
FIG. 9 shows a flowchart of a method for generating a MDP, generating an RL agent based on the MDP, and generating at least one CFE using the RL agent, according to an embodiment.

FIG. 9 shows a flowchart of a method for generating an RL agent that can cause transmission of at least one counterfactual explanation to a compute device associated with a user, according to an embodiment. At 902, a processor generates a Markov Decision Process (MDP) that includes a state space, an action space, a transition function, a reward function, and a discount factor. At 904, the processor applies a RL model to the MDP to generate a RL agent. At 906, the processor receives, at the RL agent, an input data associated with a first user. At 908, the processor generates, based on the input data, at least one CFE using the RL agent. At 910, the processor causes transmission of a representation of the at least one CFE and at least one recommended remedial action to at least one of a compute device of the first user or a compute device of a second user different from and associated with the first user. For example, the second user could be a service provider (e.g., financial advisor, medical professional, legal professional, consultant), and the first user could be a service consumer (e.g., patient, client) receiving the recommended remedial action from the second user.

Figure 10:
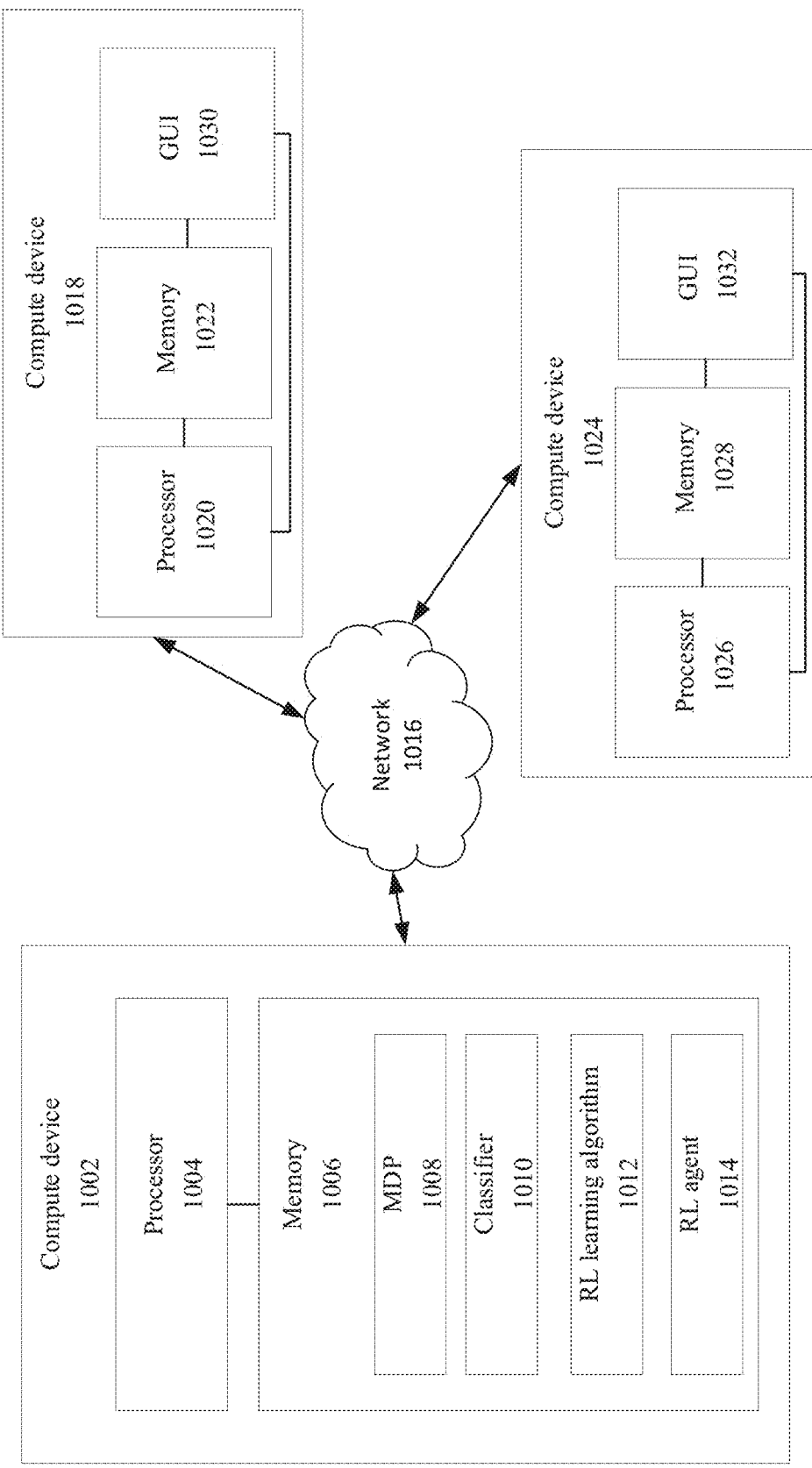
FIG. 10 shows a block diagram of a system for generating an MDP, generating an RL agent, and sharing counterfactual explanations generated by the RL agent to at least one user, according to an embodiment.

FIG. 10 shows a block diagram of a system for generating an MDP, generating an RL agent, and sharing counterfactual explanations generated by the RL agent to at least one user, according to an embodiment. The system includes compute devices 1002, 1018, 1024 interconnected via a network 1016. The network 1016 can be for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

The compute device 1002 includes a processor 1004 and memory 1006 communicably coupled to the processor 1004. The memory 1006 includes an MDP 1008, classifier 1010, RL learning algorithm 1012, and RL agent 1014. The MDP 1008 includes a state space, action space, transition function, reward function, and discount factor. Additional details related to how the MDP 1008 can be generated were discussed above herein. The classifier 1010 can be a machine learning model(s) that receives input data associated with a request, and generates output data associated with a decision/predicted outcome for that request. The classifier 1010 is associated with the MDP 1008 in that training data used to train the classifier 1010, as well as and output data previously produced by the classifier 1010, were both used to generate the MDP 1008. The RL learning algorithm 1012 can be applied to the MDP 1008 to generate the RL agent 1014.

Compute device 1018 is associated with a first user, and includes a processor 1020, memory 1022 and graphical user interface (GUI) 1030 (each of which are communicably coupled to one another). The first user can be, for example, someone applying for a loan or a job. The compute device 1018 can receive information about the first user (e.g., age, years of education, salary, race, GPA, height, weight, credit score) via the GUI 1030 so that a decision/prediction regarding a request by the first user (e.g., getting approved for a loan, getting hired for a job) can be made. Thereafter, the compute device 1018 can send the information received about the first user (or at least a portion thereof) to the compute device 1002 via the network 1016. The compute device 1002 can receive that information about the first user, and provide it to compute device 1002 so that the information is input into the classifier 1010. The classifier 1010 can then output a decision/prediction that accepts or rejects that request. If the classifier 1010 rejected the request, the RL agent 1014 can generate a counterfactual explanation(s) for why the request was rejected and/or determine at least one recommended remedial action to decrease the likelihood of getting rejected next time (i.e., increase the likelihood of getting accepted next time).

In some implementations, a signal representing the counterfactual explanation(s) and/or at least one recommended remedial action can be transmitted from the compute device 1002 and received by the compute device 1018 via the network 1016. The GUI 1030 can then inform (e.g., display information to) the first user about why their request was denied and/or any recommended remedial actions.

In some implementations, the signal representing the counterfactual explanation(s) and/or at least one recommended remedial action can be transmitted from the compute device 1002 to the compute device 1024. The compute device 1024 can be associated with a second user, and include a processor 1026, memory 1028, and GUI 1032 (each of which are communicably coupled to one another). The second user can be someone different than the first user, such as a financial advisor for the first user or a doctor for the first user. This can allow the second user to be informed (e.g., via information displayed by GUI 1032) of why the request was rejected and/or know of any recommended remedial actions. The second user can then judge how/what information is relayed to the first user.

It should be noted that, in some implementations, the compute device 1024 can be omitted (e.g., there is no second user). Alternatively or additionally, all components/functionalities of the compute device 1002, or at least a portion thereof, can be included in compute device 1018. For example, the MDP 1008, classifier 1010, RL learning algorithm 1012, and RL agent 1014 can be included in the memory 1022 of the compute device 1018, in which case counterfactual explanations and/or recommend remedial actions can be generated locally by the compute device 1018. As another example, the classifier 1010 is stored in the memory 1022 of the compute device 1018, while the MDP 1008, RL learning algorithm 1012, and RL agent 1014 are stored in the memory 1006 of the compute device 1002. In some implementations, the MDP 1008, classifier 1010, RL learning algorithm 1012, and RL agent 1014 can be included in a different compute device (not shown) different than compute devices 1002, 1018, 1024. Furthermore, although only two user compute devices are shown 1018, 1024, more than two are possible.

In one or more embodiments, each point in the sequence of steps (or recommended actions) output from a trained RL agent adheres to the supplied/received causal constraints and data manifold (e.g., based on to the tunable parameter).

In one or more embodiments the system can be used, for example, to calculate counterfactual explanations in the case of credit card loan approval decisions. The counterfactual explanations may be generated automatically and/or automatically sent to applicants once generated. The counterfactual explanations can provide applicants with an understanding of the reason(s) why their application was denied, and of actionable recommendations that may result in their being approved in the future.

In one or more embodiments, the system can be used, for example, to calculate counterfactual explanations in the case of mortgage loan approval decisions. The counterfactual explanations may be generated automatically and/or automatically sent to applicants once generated. The counterfactual explanations can provide applicants with an understanding of the reason(s) why their application was denied, and of actionable recommendations that may result in their being approved in the future.

In one or more embodiments the system can be used, for example, to calculate counterfactual explanations in the case of hiring decisions. The counterfactual explanations may be generated automatically and/or sent automatically to applicants once generated. The counterfactual explanations can provide applicants with an understanding of the reason(s) why their application was denied, and of actionable recommendations that may result in their being approved in the future.

In one or more embodiments the system can be used, for example, to calculate counterfactual explanations in the case of medical risk or a specific test prediction. The counterfactual explanations may be generated automatically and/or automatically sent to patients once generated. The counterfactual explanations can provide patients with an understanding of the reason(s) why their health was deemed to be risky or why they were recommended to undergo a series of tests, and of actionable recommendations that may result in their having reduced risk in the future.

In one or more embodiments the system can be used, for example, to calculate counterfactual explanations in the case of parole decisions. The counterfactual explanations may be generated automatically and/or automatically sent to applicants once generated. The counterfactual explanations can provide applicants with an understanding of the reason(s) why their request was denied, and of actionable recommendations that may result in their being approved in the future.

In one or more embodiments the system can be used, for example, to calculate counterfactual explanations in the case of financial decisions. The counterfactual explanations may be generated automatically and/or automatically sent to users once generated. The counterfactual explanations can provide users with an understanding of the reason(s) why a specific trend was predicted, and of actionable recommendations that may result in a different trend (or a modification to the trend) in the future.

In one or more embodiments the system can be used, for example, to calculate counterfactual explanations in the case of fraud detection. The counterfactual explanations may be generated automatically and/or automatically sent to users once generated. The counterfactual explanations can provide users with an understanding of the reason(s) why a transaction was labeled as fraudulent, and of actionable recommendations that may result in such transactions not being labeled as fraudulent in the future.

In some embodiments, a method comprises: generating, via a processor, a Markov Decision Process (MDP), based on (1) output data from a classifier, (2) training data associated with the classifier, and (3) at least one actionable feature, the MDP including a state space, an action space, a transition function, a reward function, and a discount factor; applying, via the processor, a reinforcement learning (RL) model to the MDP to generate a RL agent; receiving, via the processor and at the RL agent, first data associated with a first user; generating, via the processor and by the RL agent, at least one first counterfactual explanation (CFE) based on the first data; receiving, at the RL agent, second data associated with a second user different from the first user; generating, via the processor and by the RL agent, at least one second CFE based on the second data; causing transmission, via the processor, of a representation of the at least one first CFE to a compute device of the first user; and causing transmission, via the processor, of a representation of the at least one second CFE and at least one recommended remedial action to a compute device of the second user.

In some implementations, the at least one actionable feature includes a numerical actionable feature.

In some implementations, the at least one actionable feature includes a categorical actionable feature.

In some implementations, the at least one actionable feature includes at least two actionable features, and the generating the MDP is further based on at least one causal constraint, defining a relationship between the at least two actionable features, that is to be maintained.

In some implementations, the at least one causal constraint includes a unary constraint.

In some implementations, the at least one causal constraint includes a binary constraint.

In some implementations, the RL agent is configured to maximize the reward function In some implementations, the generating the MDP is further based on a tunable parameter associated with the reward function, the tunable parameter defining a preselectable similarity between at least one of (1) the at least one first CFE and the training data, or (2) the at least one second CFE and the training data.

In some embodiments, a method comprises generating, via a processor, a Markov Decision Process (MDP), based on (1) output data from a classifier, (2) training data associated with the classifier, and (3) at least one actionable feature, the MDP including a state space, an action space, a transition function, and a reward function; applying, via the processor, a reinforcement learning (RL) model to the MDP to generate a RL agent; receiving, via the processor and at the RL agent, an input data associated with a user; generating, via the processor and by the RL agent, at least one counterfactual explanation (CFE) based on the input data; and causing transmission, via the processor, of a representation of the at least one CFE and at least one recommended remedial action to a compute device of the user.

In some implementations, the MDP further includes a discount factor representing a relative prioritization by the RL agent of short-term reward relative to long-term reward.

In some implementations, the at least one actionable feature includes a plurality of actionable features, and the at least one CFE modifies a single actionable feature from the plurality of actionable features.

In some implementations, the MDP further includes a tunable parameter associated with the reward function defining a pre-selectable similarity between the at least one CFE and the training data.

In some implementations, the state space includes a terminal state, a dummy state, and at least one non-dummy state, and the reward function defines an association between at least one of: the terminal state and a positive reward, the dummy state and a positive reward, a transition from the terminal state to the dummy state and positive reward, performing the at least one actionable feature and a first negative reward, or achieving the at least one non-terminal state and at least one of no reward or a second negative reward.

In some implementations, the state space includes a terminal state, dummy state, and at least one non-terminal state, the at least one actionable feature includes a plurality of actionable features, and the reward function defines an association between at least one of: the terminal state and a positive reward, the dummy state and a positive reward, a transition from the terminal state to the dummy state and positive reward, performing a first actionable feature from the plurality of actionable features and a first negative reward, or performing a second actionable feature from the plurality of actionable features and a second negative reward.

In some embodiments, a method comprises generating, via a processor, a Markov Decision Process (MDP), the MDP including a state space, an action space, a transition function, a reward function, and a discount factor; applying, via the processor, a reinforcement learning (RL) model to the MDP to generate a RL agent; receiving, at the RL agent, an input data associated with a first user; generating, via the processor, by the RL agent, and based on the input data, at least one counterfactual explanation (CFE); and causing transmission, via the processor, of a representation of the at least one CFE and at least one recommended remedial action to at least one of a compute device of the first user or a compute device of a second user different from and associated with the first user.

In some implementations, the input data is a first input data and the at least one CFE is a first CFE, the method further comprising: receiving, at the RL agent, a second input data associated with a third user different from the first user and the second user; and generating, by the RL agent, a second CFE based on the second input data, the causing transmission including causing transmission of a representation of the second CFE to at least one of the compute device of the first user, the compute device of the second user, or a compute device of the third user.

In some implementations, the RL agent is configured to maximize the reward function.

In some implementations, the at least one recommended remedial action is associated with at least one of a financial decision, a medical decision, a hiring decision, a parole decision, or a fraud detection decision.

In some implementations, the action space includes a representation of a plurality of actionable features, and the at least one CFE modifies a single actionable feature from the plurality of actionable features.

In some implementations, the state space includes a terminal state, a dummy state, and at least one non-terminal state, and the reward function defines an association between at least one of: the terminal state and a positive reward, the dummy state and a positive reward, a transition from the terminal state to the dummy state and positive reward, performing an action in the action space and a first negative reward, or achieving the at least one non-dummy state and at least one of no reward or a second negative reward.

Additional embodiments and details for generating "fast" counterfactual explanations are presented herewith, in Appendix A.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
    generating, via a processor, a Markov Decision Process (MDP), based on (1) output data from a classifier, (2) training data associated with the classifier, and (3) at least one actionable feature, the MDP including a state space, an action space, a transition function, a reward function, and a discount factor;
    applying, via the processor, a reinforcement learning (RL) model to the MDP to generate a RL agent;
    receiving, via the processor and at the RL agent, first data associated with a first user;
    generating, via the processor and by the RL agent, at least one first counterfactual explanation (CFE) based on the first data;
    receiving, at the RL agent, second data associated with a second user different from the first user;
    generating, via the processor and by the RL agent, at least one second CFE based on the second data;
    causing transmission, via the processor, of a representation of the at least one first CFE to a compute device of the first user; and
    causing transmission, via the processor, of a representation of the at least one second CFE and at least one recommended remedial action to a compute device of the second user.

2. The method of claim 1, wherein the at least one actionable feature includes a numerical actionable feature.

3. The method of claim 1, wherein the at least one actionable feature includes a categorical actionable feature.

4. The method of claim 1, wherein the at least one actionable feature includes at least two actionable features, and the generating the MDP is further based on at least one causal constraint, defining a relationship between the at least two actionable features, that is to be maintained.

5. The method of claim 4, wherein the at least one causal constraint includes a unary constraint.

6. The method of claim 4, wherein the at least one causal constraint includes a binary constraint.

7. The method of claim 1, wherein the RL agent is configured to maximize the reward function.

8. The method of claim 1, wherein the generating of the MDP is further based on a tunable parameter associated with the reward function, the tunable parameter defining a pre-selectable similarity between at least one of (1) the at least one first CFE and the training data, or (2) the at least one second CFE and the training data.

9. A method, comprising:
    generating, via a processor, a Markov Decision Process (MDP), based on (1) output data from a classifier, (2) training data associated with the classifier, and (3) at least one actionable feature, the MDP including a state space, an action space, a transition function, and a reward function,
    the state space including a terminal state, a dummy state associated with the terminal state and at least one non-terminal state,
    the reward function defining an association between at least one of:
        the terminal state and a positive reward,
        the dummy state and a positive reward,
        a transition from the terminal state to the dummy state and a positive reward,
        performing the at least one actionable feature and a first negative reward, or
        achieving the at least one non-terminal state and at least one of no reward or a second negative reward;
    applying, via the processor, a reinforcement learning (RL) model to the MDP to generate a RL agent;
    receiving, via the processor and at the RL agent, an input data associated with a user;
    generating, via the processor and by the RL agent, at least one counterfactual explanation (CFE) based on the input data; and
    causing transmission, via the processor, of a representation of the at least one CFE and at least one recommended remedial action to a compute device of the user.

10. The method of claim 9, wherein the MDP further includes a discount factor representing a relative prioritization by the RL agent of short-term reward relative to long-term reward.

11. The method of claim 9, wherein the at least one actionable feature includes a plurality of actionable features, and the at least one CFE modifies a single actionable feature from the plurality of actionable features.

12. The method of claim 9, wherein the MDP further includes a tunable parameter associated with the reward function defining a pre-selectable similarity between the at least one CFE and the training data.

13. The method of claim 9, wherein the at least one actionable feature includes a plurality of actionable features, and the association between performing the at least one actionable feature and the first negative award further includes:
    performing a first actionable feature from the plurality of actionable features and the first negative reward.

14. A method, comprising
    generating, via a processor, a Markov Decision Process (MDP), the MDP including a state space, an action space, a transition function, a reward function, and a discount factor;
    applying, via the processor, a reinforcement learning (RL) model to the MDP to generate a RL agent;
    receiving, at the RL agent, an input data associated with a first user;
    generating, via the processor, by the RL agent, and based on the input data, at least one counterfactual explanation (CFE); and
    causing transmission, via the processor, of a representation of the at least one CFE and at least one recommended remedial action to at least one of a compute device of the first user or a compute device of a second user different from and associated with the first user.

15. The method of claim 14, wherein the input data is a first input data and the at least one CFE is a first CFE, the method further comprising:
    receiving, at the RL agent, a second input data associated with a third user different from the first user and the second user; and generating, by the RL agent, a second CFE based on the second input data, the causing transmission including causing transmission of a representation of the second CFE to at least one of the compute device of the first user, the compute device of the second user, or a compute device of the third user.

16. The method of claim 14, wherein the RL agent is configured to maximize the reward function.

17. The method of claim 14, wherein the at least one recommended remedial action is associated with at least one of a financial decision, a medical decision, a hiring decision, a parole decision, or a fraud detection decision.

18. The method of claim 14, wherein the action space includes a representation of a plurality of actionable features, and the at least one CFE modifies a single actionable feature from the plurality of actionable features.

19. The method of claim 14, wherein the state space includes a terminal state, dummy state, and at least one non-terminal state, and the reward function defines an association between at least one of:
- the terminal state and a positive reward,
- the dummy state and a positive reward,
- a transition from the terminal state to the dummy state and a positive reward,
- performing an action in the action space and a first negative reward, or
- achieving the at least one non-terminal state and at least one of no reward or a second negative reward.

20. The method of claim 9, wherein the at least one actionable feature includes a plurality of actionable features, and the association between performing the at least one actionable feature and the first negative award further includes:
- performing a second actionable feature from the plurality of actionable features and the second negative reward.

* * * * *